US008920918B2

(12) United States Patent
Perrone

(10) Patent No.: US 8,920,918 B2
(45) Date of Patent: Dec. 30, 2014

(54) OIL AND POLYETHYLENE GLYCOL FILL MATERIAL FOR USE IN PAINTBALL SHELLS

(75) Inventor: Aldo Perrone, Brampton (CA)

(73) Assignee: KEE Action Sports Technology Holdings, LLC, Sewell, NJ (US)

( * ) Notice: Subject to any disclaimer, the term of this patent is extended or adjusted under 35 U.S.C. 154(b) by 1710 days.

(21) Appl. No.: 11/554,362

(22) Filed: Oct. 30, 2006

(65) Prior Publication Data

US 2007/0095240 A1   May 3, 2007

Related U.S. Application Data

(60) Provisional application No. 60/731,238, filed on Oct. 31, 2005.

(51) Int. Cl.
| | | |
|---|---|---|
| B32B 3/26 | (2006.01) |
| F42B 30/00 | (2006.01) |
| C09D 1/00 | (2006.01) |
| C09D 4/00 | (2006.01) |
| C09D 5/00 | (2006.01) |
| C09D 11/00 | (2014.01) |
| C09K 3/00 | (2006.01) |
| A63B 37/00 | (2006.01) |
| A63B 37/10 | (2006.01) |
| A63B 39/00 | (2006.01) |
| A63B 41/00 | (2006.01) |
| A63B 43/00 | (2006.01) |
| A63B 43/04 | (2006.01) |
| A63B 65/00 | (2006.01) |
| A63B 67/10 | (2006.01) |
| F42B 12/40 | (2006.01) |
| F42B 6/10 | (2006.01) |
| C09D 171/02 | (2006.01) |

(52) U.S. Cl.
CPC . *F42B 12/40* (2013.01); *F42B 6/10* (2013.01); *C09D 171/02* (2013.01)
USPC ............... 428/321.5; 102/513; 106/31.03; 106/31.94; 473/577; 473/594

(58) Field of Classification Search
CPC .......... F42B 6/10; F42B 12/40; C09D 171/02
USPC ............ 524/47–51; 424/451–463; 106/31.03, 106/31.94; 102/513; 428/321.5; 473/577, 473/594
See application file for complete search history.

(56) References Cited

U.S. PATENT DOCUMENTS

| 4,565,807 | A | * | 1/1986 | Uekama et al. ................. 514/58 |
| 4,637,616 | A | | 1/1987 | Whiting |
| 4,656,092 | A | * | 4/1987 | Haman et al. .............. 428/402.2 |
| 4,695,450 | A | * | 9/1987 | Bauer et al. .................... 424/455 |
| 5,236,710 | A | | 8/1993 | Guerrero et al. |
| 5,393,054 | A | * | 2/1995 | Rouffer ......................... 473/577 |
| 5,494,938 | A | | 2/1996 | Kawa et al. |
| 5,500,067 | A | | 3/1996 | Jenkner |
| 5,587,149 | A | | 12/1996 | Punto et al. |
| 5,817,323 | A | | 10/1998 | Hutchinson et al. |
| 5,885,671 | A | | 3/1999 | Bayless et al. |
| 5,891,470 | A | | 4/1999 | Rinaldi et al. |
| 5,928,632 | A | * | 7/1999 | Reusch ...................... 424/78.03 |
| 6,200,602 | B1 | | 3/2001 | Watts et al. |
| 6,228,894 | B1 | | 5/2001 | Rinaldi et al. |
| 6,450,100 | B1 | | 9/2002 | Carson |
| 6,530,962 | B1 | * | 3/2003 | Stolz ................................ 8/576 |
| 6,546,874 | B2 | | 4/2003 | Vasel et al. |
| 6,582,727 | B2 | | 6/2003 | Tanner et al. |
| 6,998,374 | B2 | | 2/2006 | Niedbala et al. |
| 2002/0081331 | A1 | | 6/2002 | Tanner et al. |
| 2002/0134055 | A1 | | 9/2002 | Martinez, Jr. |
| 2002/0134274 | A1 | | 9/2002 | Martinez, Jr. et al. |
| 2002/0142031 | A1 | | 10/2002 | Gilleland et al. |
| 2003/0022884 | A1 | * | 1/2003 | Suzuki et al. ............ 514/217.03 |
| 2003/0046777 | A1 | | 3/2003 | Stolz |
| 2003/0047105 | A1 | | 3/2003 | Vasel et al. |
| 2003/0138482 | A1 | | 7/2003 | Fonkwe et al. |
| 2004/0161407 | A1 | * | 8/2004 | Kimura et al. ............... 424/85.7 |
| 2005/0025968 | A1 | * | 2/2005 | Liu et al. ....................... 428/402 |
| 2005/0089475 | A1 | * | 4/2005 | Gruber ......................... 424/10.1 |
| 2005/0163833 | A1 | | 7/2005 | Muller |
| 2007/0148380 | A1 | | 6/2007 | Black |

FOREIGN PATENT DOCUMENTS

| CA | 2352190 | | 6/2000 |
| CA | 2298236 | | 9/2000 |
| CA | 2473312 | | 7/2003 |
| CA | 2546004 | | 11/2005 |
| EP | 0 786 641 | * | 7/1997 |
| WO | WO 2005/040288 | * | 5/2005 |
| WO | 2005/104674 A2 | | 11/2005 |

OTHER PUBLICATIONS http://www.stochem.com/searchdb.asp?SearchStr2=&supplier=526&page=2.*

* cited by examiner

*Primary Examiner* — Gerard Higgins
*Assistant Examiner* — Sathavaram I Reddy
(74) *Attorney, Agent, or Firm* — Volpe and Koenig, P.C.

(57) ABSTRACT

A fill material is for use within a closed interior chamber of a gelatin paintball capsule. The fill material includes a polyethylene glycol and an oil. Each one of the polyethylene glycol and the oil is present in a respective amount that is substantially less than about 90% by weight of the fill material. The fill material additionally includes at least a first additive that is selected from the group consisting of an emulsifier, a dye, a density agent, a thickener, and a surfactant. Preferably, a starch may be used as the density agent, as the emulsifier, and/or as the thickener. Suitable starches may include corn starch, rice starch, potato starch, modified starch, and combinations thereof, among others.

34 Claims, No Drawings

OIL AND POLYETHYLENE GLYCOL FILL MATERIAL FOR USE IN PAINTBALL SHELLS

FIELD OF THE INVENTION

The present invention relates to the field of fill materials for use in gelatin and other capsules, and more particularly to oil and polyethylene glycol (hereinafter, alternately referred to as "PEG") fill materials for use in paintball shells, and to paintballs containing same.

BACKGROUND OF THE INVENTION

Paintball games have been played for over twenty-five years. In these games, paintballs are shot out of specially designed guns using compressed air, nitrogen or $CO_2$ gases. Typically, players on opposing teams attempt to shoot the other team's members. When a paintball strikes an opponent, the paintball shatters and releases the fill material or paint onto the player, leaving a mark and disqualifying the marked player from continuing the game.

There are two basic types of paintballs on the market. A first such type of paintball may have been comprised of PEG in an amount of over 90% by weight. Some of the advantages associated with the use of such prior art PEG fill materials in paintballs may have included the following: (a) they are substantially stable; (b) they are hydrophilic; (c) they have relatively little tendency to become rancid, and/or (d) they are a substantially non-irritant to the skin, etc. On the other hand, disadvantages may also have been associated with this type of paintball. For example, such prior art PEG-based paintballs may have been subject to significant interactions which may have occurred between the PEG-based fill material and the paintball shell. These interactions may have resulted, for example, in substantially brittle paintballs, which may have been subject, inter alia, to an increased risk of shattering whilst being fired from a paintball gun. Many significant storage and/or handling problems may also have been associated with this prior art PEG-based type of paintball—a factor which may also have created a tendency to require high levels of care in handling paintballs filled with such prior art formulations.

Another disadvantage associated with such prior art PEG-based types of paintballs may have been the high and/or increasing cost associated with manufacturing such paintballs—a disadvantage which may have been due, in part, to their fill material's high content of PEG. PEG may be a relatively expensive chemical substance, and/or it may be a chemical substance that is likely to become (even) more expensive in the coming months and/or years. Accordingly, there may be a need for a paintball fill material that contains minimal and/or reduced amounts of PEG.

A second basic type of paintball that may heretofore have been on the market is one which may have been comprised of oil in an amount of about 90-95% by weight. Though oil may be a relatively inexpensive material (in comparison to PEG), one of the disadvantages associated with the use of oil-based fill formulas in paintballs may have been a lack of water solubility. This factor may heretofore have presented a problem for paintball enthusiasts insofar as the paint residue may not have been readily cleaned from objects and/or clothing, unless the formulas also contained, for example, relatively high levels of surfactants.

The prior art has thus far failed to provide a cost effective and commercially viable system for creating paintballs that adequately addresses the aforementioned problems.

Therefore, there exists a need for improved technology relating to paintball fill formulas. In particular, there may be a need (i) to provide a paintball fill material that affords some of the desirable attributes of prior art PEG-based fill formulae, (ii) to provide a paintball fill material that avoids and/or mitigates some of the disadvantages which may heretofore have been associated, and/or which may in the future be associated with, prior art PEG-based fill formulae (e.g., to provide paintballs at lower cost, with reduced fill/shell interactions, that are less brittle, and/or which may be handled or stored more readily), and/or (iii) to provide a paintball fill material that has an improved washability in comparison to prior art oil-based fill formulae.

It is an object of this invention to obviate and/or mitigate one or more of the disadvantages associated with prior art paintballs, fill materials, and/or methods of making same.

SUMMARY OF THE INVENTION

According to the invention, there is disclosed a fill material for use within a closed interior chamber of a paintball capsule. The fill material includes a polyethylene glycol and an oil. Each one of the polyethylene glycol and the oil is present in a respective amount that is substantially less than about 90% by weight of the fill material. The fill material additionally includes at least a first additive that is selected from the group consisting of an emulsifier, a dye, a density agent, a thickener, and a surfactant.

According to an aspect of one preferred embodiment of the invention, and as aforesaid, the first additive may preferably, but need not necessarily, be a density agent. According to this aspect of the invention, the density agent may preferably, but need not necessarily, be selected from the group consisting of starch, talc, calcium carbonate, dicalcium phosphate, zinc oxide, and combinations thereof.

According to an aspect of one preferred embodiment of the invention, and as aforesaid, the density agent may preferably, but need not necessarily, be a starch. According to this aspect of the invention, the starch may preferably, but need not necessarily, be selected from the group consisting of corn starch, rice starch, potato starch, modified starch, and combinations thereof.

According to an aspect of one preferred embodiment of the invention, and as aforesaid, the starch may preferably, but need not necessarily, be a corn starch. According to this aspect of the invention, the corn starch may preferably, but need not necessarily, be present in an amount between about 1% and about 20% by weight of the fill material.

According to an aspect of one preferred embodiment of the invention, the density agent may preferably, but need not necessarily, be present in an amount between about 1% and about 40% by weight of the fill material.

According to a further aspect of one preferred embodiment of the invention, the density agent may preferably, but need not necessarily, be present in an amount between about 2% and about 35% by weight of the fill material.

According to an aspect of one preferred embodiment of the invention, the polyethylene glycol may preferably, but need not necessarily, be present in an amount substantially more than about 10% by weight of the fill material.

According to a further aspect of one preferred embodiment of the invention, the polyethylene glycol may preferably, but need not necessarily, be present in an amount between about 20% and about 60% by weight of the fill material.

According to an aspect of one preferred embodiment of the invention, the polyethylene glycol may preferably, but need not necessarily, have a mean molecular weight of between about 200 and about 600.

According to a further aspect of one preferred embodiment of the invention, the polyethylene glycol may preferably, but need not necessarily, have a mean molecular weight of about 400.

According to an aspect of one preferred embodiment of the invention, the oil may preferably, but need not necessarily, include a vegetable oil.

According to a further aspect of one preferred embodiment of the invention, the vegetable oil may preferably, but need not necessarily, be selected from the group consisting of corn oil, soybean oil, canola oil, safflower oil, sunflower oil, linseed oil, and combinations thereof.

According to an aspect of another preferred embodiment of the invention, the oil may preferably, but need not necessarily, be selected from the group consisting of mineral oils, silicone oils, aromatic oils, fatty ethers, fatty esters, and combinations thereof.

According to an aspect of one preferred embodiment of the invention, the oil may preferably, but need not necessarily, be present in an amount between about 5% and about 70% by weight of the fill material.

According to a further aspect of one preferred embodiment of the invention, the oil may preferably, but need not necessarily, be present in an amount between about 15% and about 50% by weight of the fill material.

According to an aspect of one preferred embodiment of the invention, and as aforesaid, the first additive may preferably, but need not necessarily, be a surfactant. According to this aspect of the invention, the surfactant may preferably, but need not necessarily, include a liquid nonionic surfactant that has an HLB value lying substantially within the range of between about 8 and about 14.

According to a further aspect of one preferred embodiment of the invention, the surfactant may preferably, but need not necessarily, be present in an amount between about 0.1% and about 10% by weight of the fill material.

According to a yet further aspect of one preferred embodiment of the invention, the surfactant may preferably, but need not necessarily, be present in an amount between about 0.1% and about 2% by weight of the fill material.

According to an aspect of one preferred embodiment of the invention, and as aforesaid, the first additive may preferably, but need not necessarily, be an emulsifier. According to this aspect of the invention, the emulsifier may preferably, but need not necessarily, include a copolymer having a major portion of a mono-olefinically unsaturated carboxylic acid or anhydride monomer of about 3 to about 6 carbon atoms. According to this aspect of the invention, the copolymer has a minor portion of a long chain acrylate or methacrylate ester monomer.

According to an aspect of another preferred embodiment of the invention, and as aforesaid, the first additive may preferably, but need not necessarily, be an emulsifier. According to this aspect of the invention, the emulsifier may preferably, but need not necessarily, include a copolymer having a major portion and a minor portion. The major portion may preferably, but need not necessarily, be selected from the group consisting of a mono-olefinically unsaturated carboxylic acid of about 3 to about 6 carbon atoms and a mono-olefinically unsaturated carboxylic anhydride monomer of about 3 to about 6 carbon atoms. The minor portion may preferably, but need not necessarily, be selected from the group consisting of a long chain acrylate ester monomer and a long chain methacrylate ester monomer.

According to an aspect of one preferred embodiment of the invention, and as aforesaid, the first additive may preferably, but need not necessarily, be an emulsifier. According to this aspect of the invention, the emulsifier may preferably, but need not necessarily, be a cross-linked copolymer of acrylic acid and a hydrophobic co-monomer. According to this aspect of the invention, the cross-linked copolymer has a high molecular weight.

According to a further aspect of one preferred embodiment of the invention, the cross-linked copolymer is acrylates/C10-30 alkyl acrylate cross-polymer.

According to an aspect of one preferred embodiment of the invention, and as aforesaid, the first additive may preferably, but need not necessarily, be an emulsifier. According to this aspect of the invention, the emulsifier may preferably, but need not necessarily, be present in an amount between about 0.05% and about 1% by weight of the fill material.

According to a further aspect of one preferred embodiment of the invention, the emulsifier may preferably, but need not necessarily, be present in an amount between about 0.1% and about 0.5% by weight of the fill material.

According to an aspect of one preferred embodiment of the invention, the fill material may preferably, but need not necessarily, additionally include water. The water may preferably, but need not necessarily, be present in an amount between about 1% and about 10% by weight of the fill material.

According to an aspect of one preferred embodiment of the invention, and as aforesaid, the first additive may preferably, but need not necessarily, be a thickener. According to this aspect of the invention, the thickener may preferably, but need not necessarily, include a wax.

According to a further aspect of one preferred embodiment of the invention, the wax may preferably, but need not necessarily, be selected from the group consisting of yellow beeswax, white wax, paraffin wax, and combinations thereof.

According to a aspect of one preferred embodiment of the invention, the wax may preferably, but need not necessarily, be present in an amount ranging between about 1% and about 10% by weight of the oil in the fill material.

According to an aspect of one preferred embodiment of the invention, and as aforesaid, the first additive may preferably, but need not necessarily, be a thickener. According to this aspect of the invention, the thickener may preferably, but need not necessarily, include a silica.

According to a further aspect of one preferred embodiment of the invention, the silica may preferably, but need not necessarily, be present in an amount between about 0.5% and about 5% by weight of the fill material.

According to an aspect of one preferred embodiment of the invention, and as aforesaid, the first additive may preferably, but need not necessarily, be a dye. According to this aspect of the invention, the dye may preferably, but need not necessarily, be selected from the group consisting of water soluble dyes, titanium dioxide, iron oxides, colored pigments, pearlescent pigments, fluorescent pigments, and combinations thereof.

According to the invention, there is also disclosed a fill material for use within a closed interior chamber of a paintball capsule. The fill material includes a polyethylene glycol that is present in an amount between about 20% and about 60% by weight of the fill material. The polyethylene glycol has a mean molecular weight of between about 200 and about 600. The fill material additionally includes an oil that is present in an amount between about 15% and about 50% by weight of the fill material. Further, the fill material includes water that is present in an amount between about 1% and about 10% by weight of the fill material. Still further, the fill material includes at least a first additive selected from the group consisting of an emulsifier, a dye, a density agent, a thickener, and a surfactant.

According to the invention, there is still further disclosed a paintball that includes a paintball capsule and a fill material. The paintball capsule defines a closed interior chamber, and the fill material is provided within the chamber. The fill material includes a polyethylene glycol and an oil. Each one of the polyethylene glycol and the oil is present in a respective amount that is substantially less than about 90% by weight of the fill material. The fill material additionally includes at least a first additive that is selected from the group consisting of an emulsifier, a dye, a density agent, a thickener, and a surfactant.

According to an aspect of one preferred embodiment of the invention, the paintball capsule may preferably, but need not necessarily, be substantially spherical in shape.

According to an aspect of one preferred embodiment of the invention, the paintball capsule may preferably, but need not necessarily, include a gelatin shell that encapsulates the fill material. The gelatin shell may preferably, but need not necessarily, be constructed from one or more gelatin shell ingredients that are selected from the group consisting of gelatin, gelatin substitutes, plasticizers, glycerin, sorbitol, non-crystallizing sorbitol, water, dyes, pigments, titanium dioxide, preservatives, and combinations thereof.

In accordance with the present invention, there is disclosed a paintball and a paintball fill material which obviates and/or mitigates one or more of the disadvantages associated with prior art paintballs and fill materials.

In accordance with one aspect of the present invention, there is disclosed a paintball fill formulation which includes both oil and PEG, and which enhances one or more positive attributes, and/or reduces one or more negative aspects, associated with prior art paintballs.

In accordance with another aspect of the present invention, there is disclosed a paintball fill material which may preferably, but not need not necessarily, provide greater water solubility, and/or improved washability, in comparison to prior art oil-based formulas.

In accordance with a further aspect of the present invention, there is disclosed a paintball fill material which may preferably, but not need not necessarily, advantageously provide a substantially stable mixture of oil and PEG, with reduced separation of ingredients.

In accordance with yet another aspect of the present invention, there is disclosed a paintball fill material which may preferably, but not need not necessarily, provide a range of viscosities, at temperatures from about freezing to about 40° C., which are suitable for use in paintballs.

In accordance with a yet further aspect of the present invention, there is disclosed a paintball fill material which may preferably, but not need not necessarily, provide for paintballs having reduced fill/shell interactions, minimized brittleness, and/or diminished risk of breakage whilst being fired from a paintball gun.

In accordance with still another aspect of the present invention, there is disclosed a paintball fill material which may preferably, but not need not necessarily, enable a user to control the paintball weight, flight characteristics, and/or fill density—preferably, but not necessarily, through the addition of one or more density agents.

In accordance with a still further aspect of the present invention, there is disclosed a paintball fill material which may preferably provide suitable marking characteristics in paintball games.

In accordance with another aspect of the present invention, there is disclosed a paintball fill material which may preferably provide suitable reflective characteristics to enable use in association with dyes in paintballs.

In accordance with a further aspect of the present invention, there is disclosed a paintball fill material which may preferably, but need not necessarily, be formable substantially at and/or near room temperature.

In accordance with yet another aspect of the present invention, there is disclosed a paintball fill material which may preferably, but need not necessarily, be a substantially stable mixture at temperatures at least as high as about 40° C., with little (i.e., substantially slight), or no, separation of its ingredients at such temperatures.

In accordance with a yet further aspect of the present invention, there is disclosed a paintball fill material which may preferably, but need not necessarily, be substantially stable under freeze and/or thaw conditions.

Other advantages, features and/or characteristics of the present invention, as well as methods for making the invention, functions of the related components of the invention, and/or the combination of components or economies of manufacture, may become more apparent upon consideration of the following detailed description.

DETAILED DESCRIPTION OF A PREFERRED EMBODIMENT

In one preferred embodiment according to the present invention, there is disclosed a paintball fill material for use in paintball shells. The paintball shells (hereinafter, alternately referred to as capsules) may be formed from one or more gelatin ingredients and/or from any other suitable material. Suitable gelatin ingredients may include gelatin, gelatin substitutes, plasticizers, glycerin, sorbitol, non-crystallizing sorbitol, water, dyes, pigments, titanium dioxide, and/or preservatives. It is preferable according to the invention, though it may not be necessary, for the paintball shells to be substantially spherical in shape.

According to the invention, the paintball fill material includes oil and PEG, among other things. The paintball fill material according to the present invention includes PEG in an amount ranging between substantially more than about 10% and substantially less than about 90%, by weight, of the total composition. One or more polyethylene glycols (PEGs) which are present in the paintball fill material may preferably, but need not necessarily, have a mean molecular weight of between about 200 and about 600. One or more of the PEGs may more preferably, but still need not necessarily, have a mean molecular weight of about 400. According to the invention, it may be still more preferable, though not necessary, for the paintball fill material to include one or more PEGs in a total amount ranging between about 20% and about 60%, by weight, of the total composition.

Oils which may be suitable for use in the fill material according to the present invention may preferably, but need not necessarily, include one or more natural and/or synthetic oils selected from the group which includes vegetable oils, mineral oils, silicone oils, aromatic oils, fatty ethers, fatty esters, and any number of other suitable oils and oil-like substances. In fact, it is contemplated that some waxes (which might ordinarily be solids at ambient temperatures) and/or hydrocarbons may be suitable for use, in place of oils, in the paintball fill material according to the present invention. In some cases, such waxes and/or hydrocarbons may ordinarily be liquids at ambient temperatures of about 40° C. or lower, and/or they may become liquids when mixed with one or more of the additional ingredients which may be used according to the present invention (and which are described in greater detail hereinbelow).

Vegetable oils which may preferably, but need not necessarily, be suitable for use in the paintball fill material according to the present invention may include, inter alia, one or more of the following oils: corn oil, soybean oil, canola oil, safflower oil, sunflower oil, linseed oil, and the like. In one embodiment which is contemplated according to the present invention, canola oil may be present in the paintball fill material in an amount ranging between about 5% and about 70%, by weight, of the total composition. In some contemplated embodiments according to the present invention, it may be preferable to provide paintballs in which the oil is present in an amount ranging between about 15% and about 50%, by weight, of the total fill material composition.

In some preferred embodiments according to the invention, the paintball fill material may additionally comprise an emulsifier. It is generally believed, though not essential to the working of the present invention, that suitable emulsifiers may preferably include starches and/or copolymers having a major portion of a mono-olefinically unsaturated carboxylic acid or anhydride monomer of about 3 to about 6 carbon atoms, and a minor portion of a relatively long chain acrylate or methacrylate ester monomer. It is additionally believed, though still not essential to the working of the present invention, that exemplary long chains which may preferably, but need not necessarily, be suitable for use in emulsifiers according to the present invention may include, inter alia, chains of between about 9 and about 31 carbon atoms. The International Nomenclature Cosmetic Ingredient (INCI, nee Cosmetics, Toiletries & Fragrance Association or CTFA) name for one such emulsifier which may preferably, but need not necessarily, be suitable for use in the paintball fill material according to the present invention is acrylates/$C_{10}$-$C_{30}$ alkyl acrylate cross-polymer.

It is generally believed, though not essential to the working of the present invention, that suitable emulsifiers may preferably also include cross-linked copolymers of acrylic acid and a hydrophobic co-monomer. Where such emulsifiers are suitable, they may preferably aid in forming an emulsion of oil-in-PEG (and/or PEG-in-oil). In such contemplated oil-in-PEG embodiments, a lipophilic portion of the emulsifier may preferably interact with the oil at the oil-PEG interface, and a hydrophilic portion of the emulsifier may interact with the PEG, forming a network of the PEG around droplets of the oil. Of course, it will be appreciated by persons having ordinary skill in the art that, among others, any emulsifiers which provide for a substantially stable emulsion and/or mixture of the oil and the PEG, with little (i.e., substantially slight) or no separation of the component ingredients, may be used in the paintball fill material according to the present invention.

It is contemplated that some emulsifiers which may be suitable for use in the paintball fill material according to the present invention may contain relatively high levels of hydrophobic groups. It may be generally believed, though it is not essential to the working of the present invention, that such high levels of hydrophobic groups may enable relatively high levels of oils to be emulsified. Preferably, though still not essential to the working of the present invention, these high levels of hydrophobic groups may enable relatively high levels of oils to be emulsified within a range of pH values from about 4 to about 5.

Some emulsifiers which are contemplated as being suitable for use according to the present invention may preferably, but need not necessarily, be present in an amount ranging between about 0.05% and about 1.0%, by weight, of the total composition. It is further contemplated that, more preferably, the emulsifiers may be present in an amount ranging between about 0.1% and about 0.5%, by weight, of the total composition.

In addition to and/or apart from emulsifiers, additional ingredients may preferably be used in the paintball fill material according to the present invention. In some embodiments which are contemplated according to the present invention, these additional ingredients may preferably, but need not necessarily, include surfactants, dyes, water, thickeners, and/or density agents (among other things).

As aforesaid, in some preferred embodiments which are contemplated according to the present invention, surfactants may be used in the paintball fill material. It may be generally believed, though it may not be essential to the working of the present invention, that these surfactants may aid in reducing the particle size of the oil within the fill material and/or in improving washability. Though not specifically required according to the invention, when such surfactants are used in combination with emulsifiers, their use may additionally aid in reducing the particle size of droplets of the oil which may be preferably be formed when the emulsion is made.

It may be contemplated, though not essential, that some nonionic surfactants having an HLB value in the range of between about 8 and about 14 may preferably, but need not necessarily, be suitable for use in the paintball fill material according to the present invention. It is further contemplated that, in some embodiments, it may be possible to provide the surfactant in a relatively low amount which may preferably, but need not necessarily, range between about 0.1% and about 5%, by weight, of the total fill material composition. It is contemplated that, more preferably, the surfactant may be present in an amount ranging between about 0.1% and about 2.0%, by weight, of the total fill material composition.

In some contemplated embodiments of the present invention, a dye may be added to the oil and PEG formulation. The dye may preferably, but need not necessarily, be being selected from a group that includes water soluble dyes, titanium dioxide, iron oxides, colored pigments, pearlescent pigments, and fluorescent pigments (among others).

As aforesaid, water may be present in the paintball fill material formulation. Though it may not be essential to the working of the present invention, it may be generally believed that water may help to activate the reaction between the PEG and the emulsifier (if present). It is contemplated that, in some preferred embodiments, water may preferably, but need not necessarily, be present in an amount ranging between about 1% and about 10%, by weight, of the total fill material composition. More preferably, it is contemplated that water may be present in the paintball fill material in the range of between about 3% and about 7%, by weight, of the total fill material composition.

It is contemplated that, in some embodiments of the invention, thickeners may be added to the oil and PEG fill material formulation. Though it may not be essential to the working of the present invention, it may be generally believed that thickeners may preferably, but need not necessarily, help to adjust the viscosity of the fill material. In the field of paintball games, it may be preferable to offer both thick and thin paint formulations for commercial sale, since one or the other, or both, may be requested by paintball gaming enthusiasts. It may be contemplated, though it is not essential to the working of the present invention, that suitable thickeners for use in the paintball fill material may include starches and/or wax thickeners. Examples of some suitable wax thickeners may preferably, but need not necessarily, include yellow beeswax, white wax, paraffin waxes, and/or other wax-like substances. In fact, it is contemplated that some oils (which might ordinarily be liquids at ambient temperatures), e.g., vegetable oils, may be suitable for use, in place of waxes, in the paintball fill material according to the present invention. In some cases, such oils may ordinarily be solids at ambient temperatures of about 0° C. or higher, and/or they may tend to solidify when mixed with one or more of the other ingredients which may be used according to the present invention (and which are described in greater detail elsewhere herein).

It is contemplated, though not essential to the working of the present invention, that wax thickeners may be present in an amount that ranges between about 1% and about 10% of the amount of the oil present in the formula, by weight, of the total fill material composition. It is contemplated that the amount of the thickener which is present may be selected to obtain a required and/or desired end-viscosity for the paintball fill material.

It may be possible to use silica thickeners in the paintball fill material formulation. It is contemplated that, when silica thickeners are used, they may preferably be present in an amount ranging between about 0.5% and about 5% by weight of the total fill material composition. Once again, the specific amount of any silica thickener which is present in the fill material may be selected to obtain a required and/or desired end-viscosity.

As mentioned above, it is contemplated that some embodiments of the paintball fill material according to the present invention may include density agents (i.e., in addition to the oil and the PEG). Though not essential to the working of the present invention, it may be generally believed that the density agents (and/or mixture of density agents) may preferably, but need not necessarily, help to increase the density of the paintball fill material—possibly to meet a required and/or desired paintball weight specification. It may be contemplated, though it is not essential, that exemplary density agents which may be suitable for use in the paintball fill material according to the present invention may preferably, but need not necessarily, include starch, talc, calcium carbonate, dicalcium phosphate, zinc oxide, and mixtures thereof (among other things). It is contemplated, though not essential to the invention, that some suitable starches may include (but are not limited to) corn starch, rice starch, potato starch, modified starches, and mixtures and/or combinations thereof. Of course, as may be appreciated by persons having ordinary skill in the art, and number of other starches might also be used according to the present invention. Though not essential to the working of the present invention, it may be generally believed that starches (potentially including some or all of the aforementioned starches), in addition to any contemplated uses as density agents, may be capable of functioning as emulsifiers and/or thickeners (as such terms may be used herein).

It is contemplated that, in some embodiments, the density agents may preferably, but need not necessarily, be present in amounts ranging between about 1% and about 40%, by weight, of the total fill material composition. In some embodiments, the density agents may, more preferably, be present in amounts ranging between about 2% and about 35%, by weight, of the total fill material composition. In some other embodiments, and by way of a non-limiting example, it is contemplated that, where the density agent is corn starch, it may preferably, but need not necessarily, be effective (e.g., to achieve a desired density and/or weight specification for the paintball) to provide the corn starch in an amount that ranges between about 1% and about 20%.

A fill formula according to the invention might be prepared by the following general process. An initial mixture might be prepared by adding a surfactant to a vegetable oil. The oil/surfactant blend might then be set aside to be used later in the process.

Polyethylene glycol might then be transferred into a suitable mixing tank. A suitable emulsifier (for example, possibly, a starch and/or an acrylates/$C_{10}$-$C_{30}$ alkyl acrylate crosspolymer) might be added to the PEG and mixed. Such mixing might preferably continue at a speed that may preferably, but need not necessarily, range between about 800 and about 1500 RPM, preferably until the emulsifier is substantially uniformly dispersed in the PEG.

Water might then be added to the PEG/emulsifier dispersion. Though not essential to the working of the present invention, it may be generally believed that the addition of water in this manner may preferably help to activate any interaction between the PEG and some (though not necessarily all) of the preferred emulsifiers. With this interaction, the mixture may preferably begin and/or continue to thicken. Preferably, the PEG/water solution might be substantially at the required pH to allow the emulsifier to swell and/or to increase the viscosity of this solution. Preferably, no other neutralizing agents will need to be used to adjust the pH.

Dyes may be dissolved in a portion of the required water and added at this stage of the formulation to achieve a desired fill material color.

Preferably, but not necessarily, whilst still stirring at a speed that may preferably be in the range of between about 800 RPM and about 1500 RPM, the initial mixture containing the vegetable oil and surfactant blend might then be slowly added to the PEG/emulsifier mixture. The fill material formulation may preferably continue to thicken as an oil-in-PEG emulsion is formed.

The density agent(s) might then be slowly added to the mixture. Preferably, mixing will continue until a uniform consistency is reached. Preferably, but not necessarily, opacifiers such as titanium dioxide and/or other required pigments may also be added at this stage.

The resulting oil-in-PEG emulsion fill material formulation may preferably, but need not necessarily, be in a flowable state. As well, it will also preferably be ready for encapsulation substantially immediately after the mixing process. Preferably, the formulation will be substantially stable substantially until it is required for the encapsulation process, and even more preferably, it will be substantially stable substantially permanently.

Alternately, it is contemplated that a paintball fill material according to the present invention might be prepared by the following general process. PEG might be transferred into a suitable mixing tank, and water along with a thickener, such as starch, might be added thereto and mixed. Such mixing might preferably continue at a speed that may preferably, but need not necessarily, range between about 800 RPM and about 1500 RPM—preferably, but not necessarily, until after the water and the thickener are substantially uniformly dispersed in the PEG. To this initial mixture might then be added a pre-mixed blend of a surfactant and a vegetable oil. Dyes might be dissolved in a portion of the required water and added of the formulation to achieve a desired fill material color. Preferably, the mixture of oil and PEG might thicken as the fill material is formed. The resulting oil and PEG fill material may preferably, but need not necessarily, be substantially stable substantially permanently.

Using one or more of the methods which are described hereinabove, and/or other methods within the scope of the present invention, it is contemplated that it may be possible to prepare the following exemplary fill formulas by adding the listed ingredients in the amounts specified Table 1 below.

TABLE 1

| Ingredient | Example 1 (% w/w) | Example 2 (% w/w) |
|---|---|---|
| Canola oil | 15.0 | 31.0 |
| Surfactant | 1.0 | 1.0 |
| Polyethylene glycol 400 | 49.0 | 35.0 |
| Water | 5.0 | 5.0 |
| Corn starch | 20.0 | 15.0 |
| Talc | 10.0 | 13.0 |
| Total % | 100.0 | 100.0 |

The invention as described references various specific and preferred embodiments and defines specific fill material formulation methods and/or processes. It will be understood, however, that reasonable modifications of such embodiments, methods and/or processes can be made whilst remaining within the spirit and scope of the invention.

That is, other modifications and alterations may be used in the design, manufacture, or carrying out of other embodiments according to the present invention without departing from the spirit and scope of the invention, which is limited only by the claims of this application. For example, the fill formulation might be used apart from in paintball shells, such as, for example, in other capsules, and as a carrier generally.

I claim:

1. A fill material for use within a closed interior chamber of a paintball capsule, said fill material comprising polyethylene glycol, an oil, starch, water, and a dye wherein the polyethylene glycol is in an amount between 20% and 60% by weight of the fill material, the oil is in an amount between 31% and 50% by weight of the fill material, the starch is in an amount between 1% and 20% by weight of the fill material, and the water is in an amount between 5% and about 10% by weight of the fill material.

2. The fill material according to claim 1 further comprising a density agent selected from the group consisting of talc, calcium carbonate, dicalcium phosphate, zinc oxide, and combinations thereof.

3. The fill material according to claim 1, wherein said starch is selected from the group consisting of corn starch, rice starch, potato starch, modified starch, and combinations thereof.

4. The fill material according to claim 3, wherein said starch is corn starch.

5. The fill material according to claim 1, wherein said polyethylene glycol has a mean molecular weight of between about 200 and about 600.

6. The fill material according to claim 5, wherein said polyethylene glycol has a mean molecular weight of about 400.

7. The fill material according to claim 1, wherein said oil comprises a vegetable oil.

8. The fill material according to claim 7, wherein said vegetable oil is selected from the group consisting of corn oil, soybean oil, canola oil, safflower oil, sunflower oil, linseed oil, and combinations thereof.

9. The fill material according to claim 1, wherein said oil is selected from the group consisting of mineral oils, silicone oils, aromatic oils, fatty ethers, fatty esters, and combinations thereof.

10. The fill material according to claim 1, wherein said dye is a water soluble dye.

11. The fill material according to claim 1, further comprising at least one additive selected from the group consisting of an emulsifier, a thickener, and a surfactant.

12. The fill material according to claim 11, wherein said at least one additive is said surfactant, said surfactant comprising a liquid nonionic surfactant having an HLB value between about 8 and about 14.

13. The fill material according to claim 12, wherein said surfactant is present in an amount between about 0.1% and about 10% by weight of said fill material.

14. The fill material according to claim 13, wherein said surfactant is present in an amount between about 0.1% and about 2% by weight of said fill material.

15. The fill material according to claim 11, wherein said at least one additive is said emulsifier, said emulsifier comprising a copolymer having a major portion and a minor portion, wherein said major portion is selected from the group consisting of a mono-olefinically unsaturated carboxylic acid of about 3 to about 6 carbon atoms and a mono-olefinically unsaturated carboxylic anhydride monomer of about 3 to about 6 carbon atoms, and wherein said minor portion is selected from the group consisting of a long chain acrylate ester monomer and a long chain methacrylate ester monomer.

16. The fill material according to claim 11, wherein said at least one additive is said emulsifier, said emulsifier comprising a cross-linked copolymer of acrylic acid and a hydrophobic co-monomer.

17. The fill material according to claim 11, wherein the at least one additive is said emulsifier, said emulsifier comprising acrylates/$C_{10-30}$ alkyl acrylate cross-polymer.

18. The fill material according to claim 11, wherein said at least one additive is said emulsifier, wherein said emulsifier is present in an amount between about 0.05% and about 1% by weight of said fill material.

19. The fill material according to claim 18, wherein said emulsifier is present in an amount between about 0.1% and about 0.5% by weight of said fill material.

20. The fill material according to claim 11, wherein said at least one additive is said thickener, and said thickener comprises a wax.

21. The fill material according to claim 20, wherein said wax is selected from the group consisting of yellow beeswax, white wax, paraffin wax, and combinations thereof.

22. The fill material according to claim 20, wherein said wax is present in an amount ranging between about 1% and about 10% by weight of said oil in said fill material.

23. The fill material according to claim 11, wherein said at least one additive is said thickener, and said thickener comprises a silica.

24. The fill material according to claim 23, wherein said silica is present in an amount between about 0.5% and about 5% by weight of said fill material.

25. A fill material for use within a closed interior chamber of a paintball capsule, said fill material comprising polyethylene glycol in an amount between about 20% and about 60% by weight of said fill material and having a mean molecular weight of between about 200 and about 600, oil in an amount between about 31% and about 50% by weight of said fill material, starch in an amount between 1% and 20% by weight of the fill material, water in an amount between 5% and about 10% by weight of said fill material, and a dye.

26. The fill material according to claim 25, further comprising a density agent in addition to the starch.

27. The fill material of claim 25, wherein said dye is a water soluble dye.

28. The fill material according to claim 25, further comprising at least one additive selected from the group consisting of an emulsifier, a thickener, and a surfactant.

29. A paintball comprising a paintball capsule defining a closed interior chamber and a fill material within said chamber, said fill material comprising polyethylene glycol, oil, starch, water, and dye, wherein the polyethylene glycol is in an amount between 20% and 60% by weight of the fill material, the oil is in an amount between 31% and 50% by weight of the fill material, the starch is in an amount between 1% and 20% by weight of the fill material, and the water is in an amount between 5% and about 10% by weight of said fill material.

30. The paintball according to claim 29, wherein said paintball capsule is spherical.

31. The paintball according to claim 30, wherein said paintball capsule comprises a gelatin shell that encapsulates said fill material, wherein said gelatin shell further comprises one or more ingredients selected from the group consisting of, gelatin substitutes, plasticizers, glycerin, sorbitol, non-crystallizing sorbitol, water, dyes, pigments, titanium dioxide, preservatives, and combinations thereof.

32. The paintball according to claim 29, further comprising a density agent in addition to the starch.

33. The paintball according to claim 29, wherein said dye is a water soluble dye.

34. The paintball according to claim 29, wherein said fill material further comprises at least one additive selected from the group consisting of an emulsifier, a thickener, and a surfactant.

* * * * *